US009969851B2

(12) United States Patent
Kia et al.

(10) Patent No.: US 9,969,851 B2
(45) Date of Patent: May 15, 2018

(54) METHOD FOR CONTROLLING SHRINKAGE OF A COMPOSITE

(71) Applicants: Beijing University of Chemical Technology, Beijing (CN); GM GLOBAL TECHNOLOGY OPERATIONS LLC, Detroit, MI (US)

(72) Inventors: Hamid G. Kia, Bloomfield Hills, MI (US); Xiaonong Chen, Beijing (CN); Li Cao, Beijing (CN); Qijiayu Wu, Beijing (CN)

(73) Assignees: BEIJING UNIVERSITY OF CHEMICAL TECHNOLOGY, Beijing (CN); GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/505,213

(22) PCT Filed: Sep. 4, 2014

(86) PCT No.: PCT/US2014/054161
§ 371 (c)(1),
(2) Date: Feb. 20, 2017

(87) PCT Pub. No.: WO2016/036376
PCT Pub. Date: Mar. 10, 2016

(65) Prior Publication Data
US 2017/0267819 A1  Sep. 21, 2017

(51) Int. Cl.
| C08G 63/02 | (2006.01) |
| C08J 5/06 | (2006.01) |
| C08L 1/02 | (2006.01) |
| C08L 39/02 | (2006.01) |
| B29B 7/00 | (2006.01) |
| B29C 37/00 | (2006.01) |
| B29K 1/00 | (2006.01) |
| B29K 105/06 | (2006.01) |
| B29K 201/00 | (2006.01) |

(52) U.S. Cl.
CPC ............... *C08J 5/06* (2013.01); *B29B 7/005* (2013.01); *B29C 37/006* (2013.01); *C08L 1/02* (2013.01); *C08L 39/02* (2013.01); *B29C 2037/90* (2013.01); *B29K 2001/00* (2013.01); *B29K 2105/06* (2013.01); *B29K 2201/00* (2013.01); *C08J 2339/02* (2013.01); *C08J 2401/02* (2013.01); *C08L 2205/16* (2013.01)

(58) Field of Classification Search
USPC ......................................................... 523/210
See application file for complete search history.

(56) References Cited

U.S. PATENT DOCUMENTS

| 7,268,199 B2 | 9/2007 | Andre et al. |
| 2003/0142931 A1 | 7/2003 | Oishi et al. |
| 2006/0057335 A1 | 3/2006 | Wang et al. |
| 2009/0304935 A1 | 12/2009 | Nazri et al. |
| 2011/0263756 A1 | 10/2011 | Yano et al. |

FOREIGN PATENT DOCUMENTS

WO    WO 2009/059382    5/2009

OTHER PUBLICATIONS

Nihei, et al, "Three-body-wear resistance of the experimental composites containing filler treated with hydrophobic silane coupling agents" Dental Mat. 2008 V:24 I:6.
International Search Report and Written Opinion for International application No. PCT/US2014/054161 dated May 13, 2015, 9 pages.
Li, Xue, et al., "Chemical Treatments of Natural Fiber for Use in Natural Fiber-Reinforced Composites: A Review", J. Polym. Environ., 2007, 15:25-33.

*Primary Examiner* — Terressa Boykin
(74) *Attorney, Agent, or Firm* — Harness, Dickey & Pierce, P.L.C.

(57) ABSTRACT

In a method for controlling shrinkage of a composite, a dried hydrophobically modified cellulose-based fiber is exposed to a slow acting resin system having a first curing time. An excess amount of the slow acting resin system is removed to separate out the pre-wetted hydrophobically modified cellulose-based fiber. The pre-wetted hydrophobically modified cellulose-based fiber is mixed with a fast acting resin system to form a mixture. The fast acting resin system has a second curing time that is less than the first curing time. The mixture is molded at a predetermined temperature. The fast acting resin system is cured prior to the slow acting resin system, and the slow acting resin system flows into free space within the curing fast acting resin system prior to the slow acting resin system being cured.

22 Claims, 1 Drawing Sheet

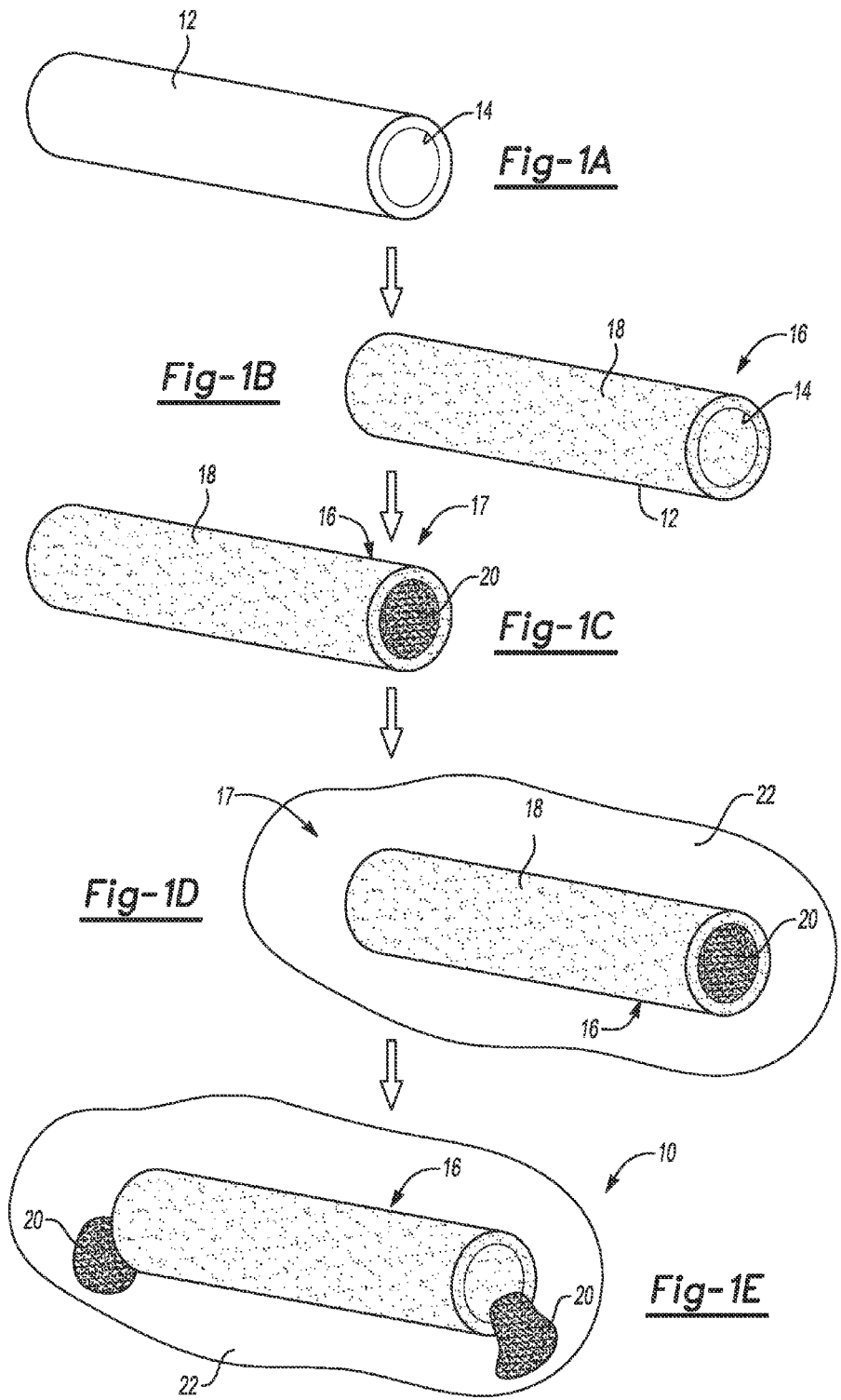

METHOD FOR CONTROLLING SHRINKAGE OF A COMPOSITE

BACKGROUND

Composite parts often include a thermoset resin. Molecules of the thermoset resin crosslink during a curing process that is used to form the composite part. During the curing process, chemical shrinkage results and the physical and mechanical properties of the composite part develop. In an effort to control chemical shrinkage, a thermoplastic resin has been used in combination with the thermoset resin. The thermoplastic resin acts as a low shrink additive. As polymerization takes place, styrene in the thermoplastic phase migrates out to chemically react with the thermoset resin. This migration causes micro-cracks and/or voids, etc. to form within the thermoplastic phase. The micro-cracks and/or voids contribute to the thermoplastic resin being able to compress during molding and expand after molding. The expansion of the thermoplastic resin helps combat the chemical shrinkage of the thermoset resin.

SUMMARY

In a method for controlling shrinkage of a composite, a dried hydrophobically modified cellulose-based fiber is exposed to a slow acting resin system having a first curing time. An excess amount of the slow acting resin system is removed to separate out the pre-wetted hydrophobically modified cellulose-based fiber. The pre-wetted hydrophobically modified cellulose-based fiber is mixed with a fast acting resin system to form a mixture. The fast acting resin system has a second curing time that is less than the first curing time. The mixture is molded at a predetermined temperature. The fast acting resin system is cured prior to the slow acting resin system, and the slow acting resin system flows into free space within the curing fast acting resin system prior to the slow acting resin system being cured.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A through 1E are schematic illustrations that together illustrate an example of the method for controlling shrinkage of a composite.

DETAILED DESCRIPTION

Examples of the method disclosed herein control shrinkage of a composite material through a bimodal chemical reaction curing process of a specific resin package including a slow acting resin system and a fast acting resin system. The bimodal chemical reaction curing process cures the fast acting resin system more rapidly than the slow acting resin system. In the method disclosed herein, the specific resin package is coupled with a hydrophobically modified cellulosed-based fiber, which contributes to the behavior of the resins during curing. As will be described in more detail herein, the combination of i) the hydrophobically modified fiber and ii) the phases of the resin systems during the curing process enables the resin package to reduce shrinkage of the composite that is formed.

The resin package used in the method includes two resin systems. More specifically, the resin package includes a slow acting resin system and a fast acting resin system. As used herein, the term "resin system" refers to a composition including at least a polymer resin (e.g., polyester) and a curing agent. The slow acting resin system includes a polymer resin and a slow curing agent that is selected to obtain a desirable curing time (i.e., time to peak exotherm at a particular curing temperature). In the examples disclosed herein, the slow curing agent is selected so that it renders the slow acting resin system with a curing time ranging from about 0.5 minutes (30 seconds) to about 5 minutes. Some examples of the slow curing agent include an initiator having a 10 hour half-life at temperatures greater than 100° C. The fast acting resin system cures faster than the slow acting resin system, and has a curing time that is a percentage of the curing time of the slow acting resin system. In an example, the curing time of the fast acting resin system is 20% to 80% of the curing time of the slow acting resin system. As such, in the examples disclosed herein, a fast curing agent is selected so that it renders the fast acting resin system with a curing time ranging from about 0.1 minutes (20% of 0.5 minutes) to about 4 minutes (80% of 5 minutes). Some examples of the fast curing agent include an initiator having a 10 hour half-life at temperatures less than 50° C.

In the method disclosed herein, it is believed that using the slow and fast acting resin systems with the hydrophobically modified cellulose-based fiber generates a composite that undergoes less shrinkage than other composites based on polyester resins. As examples, the chemical shrinkage of a polyester resin with no added fibers is about 8%; the chemical shrinkage of a polyester resin with 5 wt % of hydrophobically modified cellulose-based fibers is about 7%; and the chemical shrinkage of the polyester resin package disclosed herein with 5 wt % of hydrophobically modified cellulose-based fibers ranges from about 1% to about 3%.

Referring now to FIGS. 1A through 1E, an example of the method for controlling shrinkage of a composite 10 is schematically depicted. In particular, FIGS. 1A and 1B depict the formation of the hydrophobically modified cellulose-based fiber 16, and FIGS. 1C through 1E depict the steps involved in forming the composite. It is to be understood that while FIGS. 1A through 1E are discussed herein in order, if the hydrophobically modified cellulose-based fibers are purchased (as opposed to being manufactured), the method for controlling shrinkage may begin at FIG. 1C.

As shown in FIG. 1B, the method utilizes the hydrophobically modified cellulose-based fiber 16. The hydrophobically modified cellulose-based fiber 16 includes a cellulose-based fiber 12 that has been treated to increase its hydrophobicity. In the examples disclosed herein, a positively charged polymer 18 is used to treat the cellulose-based fiber 12. As will be described in more detail below, the positively charged polymer 18 can adsorb onto the negatively charged cellulose-based fiber surface via electrostatic interaction.

Cellulose-based fibers 12 (shown in FIG. 1A) are suitable reinforcement fillers in composites, in part because these fibers 12 have a high specific strength and modulus, a low density, a relatively low cost, and biodegradability. Cellulose-based fibers 12 are natural, negatively charged fibers. Examples of the fibers 12 include cellulose fibers, hemicellulose fibers, or fibers including both cellulose and hemicellulose. These fibers 12 can be obtained from plant raw materials, such as wood, bamboo, hemp, jute, kenaf, cotton, beet, and pulp obtained from these plant raw materials.

As shown in FIG. 1A, the cellulose-based fiber 12 has a tube-like structure. The center (or core) 14 of the fiber 12 is hollow and is exposed at least at opposed ends of the fiber 12. While not shown, it is to be understood that the surface of the fiber 12 may also have some pores, voids, etc. formed therein. The cellulose-based fiber 12 may also have any suitable dimensions. In an example, the average diameter of the cellulose-based fibers 12 is about 50 µm.

The cellulose-based fibers 12 are initially hydrophilic. In the examples disclosed herein, the cellulose-based fibers 12 are treated to increase the hydrophobicity (i.e., decrease the hydrophilicity). Increasing the hydrophobicity has several advantages. One advantage is that the hydrophobic modification renders the surfaces of the hydrophobically modified cellulose-based fibers 16 (including the center 14) more compatible with the polyester resin systems. For example, the hydrophobicity enables the liquid or gel form of the slow acting resin system to be readily introduced into or pulled from the hydrophobic center 14. For another example, the hydrophobicity improves the intermolecular compatibility of the fiber 16 with the cured form of the fast and slow acting resin systems, which leads to improved interfacial adhesion between the fibers 16 and cured resin systems and improved mechanical properties of the composites. Another advantage is that the hydrophobic modification reduces fiber agglomeration during composite fabrication. Still another advantage is that the hydrophobic surface blocks the moisture penetration path, thereby improving the moisture resistance of the resulting composite. This contributes to dimensional stability in a humid environment.

The positively charged polymer 18 is used to treat the cellulose-based fibers 12 to increase the hydrophobicity. In an example, the positively charged polymer 18 is a hydrophobically modified poly(vinyl amine). Poly(vinyl amine) is a polyelectrolyte having pendant amine groups. These amine groups provide suitable sites for grafting other functional groups, including hydrophobic groups, to the polymer backbone.

Poly(vinyl amine) may be commercially available or may be formed from a polyvinylformamide (PNVF) solution. Forming poly(vinyl amine) from PNVF may be desirable, due to its ability to hydrolyze (especially in alkaline conditions). In an example when PNVF is used, an excess sodium hydroxide solution may be added to the PNVF solution and the mixture may be stirred in a water bath at about 80° C. The pH value of the solution may be adjusted to 9, and the solution may be allowed to dialyze in deionized water using a cellulose dialysis membrane with a MWCO of 3.5 kDa until the conductivity reaches a constant value. The solution may be freeze-dried to obtain dried poly(vinyl amine).

In the examples disclosed herein, some epoxides may be used to hydrophobically modify the poly(vinyl amine) through a ring-opening reaction of the amine group of poly(vinyl amine) in alkaline conditions. There are two factors affecting the hydrophobicity of the hydrophobically modified poly(vinyl amine), one is the structure of the pendant group and the other is the degree of substitution (DS) of the pendant group on the poly(vinyl amine) chain (which may be adjusted by varying the epoxide/poly(vinyl amine) mole ratio).

It has been found that some epoxides with alkane groups as the pendant group and some with benzene as the pendant group are suitable for hydrophobically modifying the poly(vinyl amine). The substitution of poly(vinyl amine) with different epoxides changes the inter- and intra-molecular interactions of charged poly(vinyl amine) molecules in water. In the examples disclosed herein, it is desirable that the hydrophobically modified poly(vinyl amine) be capable of dissolving in appropriate pH ranges. Epoxides with 12 and 14 carbon atoms (e.g., 1,2-Epoxydodecane (EPD) and 1,2-Epoxytetradecane (EPT)) form gels under acid conditions and are insoluble in both neutral and alkaline conditions (even at very low DS, e.g., 0.016 and 0.019). As such, these epoxides are not believed to be suitable for the hydrophobic modification of poly(vinyl amine) or the fibers 12 in an aqueous medium. Rather, epoxides with 4 carbon alkane pendent groups (1,2-Epoxybutane (EPB)), 6 carbon alkane pendent groups (1,2-Epoxyhexane (EPH)), and 8 carbon alkane pendent groups (1,2-Epoxyoctane (EPO), and epoxides with styrene oxide pendent groups are soluble in acidic, neutral and alkaline conditions, and may be used at varying DS (see Table 1).

TABLE 1

Substituted degree and solubility of Hydrophobically Modified Poly(vinyl amine)

| Sample | Alkylating agent | DS calculated from $^1$H-NMR* | Solubility** pH 3 | pH 7 | pH 9 |
|---|---|---|---|---|---|
| PVAm-C4-15 | 1,2-Epoxybutane (EPB) | 0.15 | s | s | s |
| PVAm-C4-39 | | 0.39 | s | s | s |
| PVAm-C6-4.4 | 1,2-Epoxyhexane (EPH) | 0.044 | s | s | s |
| PVAm-C6-29 | | 0.29 | s | s | s |
| PVAm-C6-44 | | 0.44 | s | s | s |
| PVAm-C8-9.9 | 1,2-Epoxyoctane (EPO) | 0.099 | s | s | s |
| PVAm-C8-29 | | 0.29 | s | s | s |
| PVAm-C12-2.3 | 1,2-Epoxy-dodecane (EPD) | 0.023 | gel | ins | ins |
| PVAm-C12-3.9 | | 0.039 | gel | ins | ins |
| PVAm-C12-4.6 | | 0.046 | gel | ins | ins |
| PVAm-C14-1.6 | 1,2-Epoxytetra-decane (EPT) | 0.016 | gel | ins | ins |
| PVAm-C14-1.9 | | 0.019 | gel | ins | ins |
| PVAm-STO-10 | Styrene oxide (STO) | 0.1 | s | s | s |
| PVAm-STO-29 | | 0.29 | s | s | s |
| PVAm-STO-36 | | 0.36 | s | s | s |
| PVAm-STO-48 | | 0.48 | s | s | gel |

*DS of each sample was determined from the relative peak areas of the backbone and the pendant group protons
**"s" stands for "soluble," "ins" stands for "insoluble" and "gel" indicates that the polymer forms a gel in water.

Table 2 illustrates the contact angles of a glass surface with or without hydrophobically modified poly(vinyl amine). In Table 2, n is the number of carbons in the pendant group on the coating polymers. DS×n is adopted as an index of hydrophobicity.

TABLE 2

Contact angles of glass surface without or with polymer coating films

| Sample | n | DS × n | Contact angle (°) |
|---|---|---|---|
| Bare glass | — | — | 26 |
| PVAm | — | — | 77 |
| PVAm-C4-15 | 4 | 0.61 | 53 |
| PVAm-C4-39 | | 1.60 | 83 |
| PVAm-C6-4.4 | 6 | 0.26 | 55 |
| PVAm-C6-29 | | 1.79 | 66 |
| PVAm-C6-44 | | 2.63 | 77 |
| PVAm-STO-10 | 6(Ph.) | 0.60 | 78 |
| PVAm-STO-29 | | 1.62 | 112 |
| PVAm-STO-36 | | 2.16 | 122 |
| PVAm-C8-9.9 | 8 | 0.79 | 57 |
| PVAm-C8-29 | | 2.39 | 74 |

With the same alkane agent, the contact angle on the polymer film increases with an increasing substitution degree. A linear relationship of the contact angle with the DS×n of the hydrophobically modified poly(vinyl amine) is observed. Among all the hydrophobically modified poly(vinyl amine)s, poly(vinyl amine) modified with styrene oxide exhibits the highest hydrophobicity. Table 2 also illustrates that the hydrophobicity of the hydrophobically modified poly(vinyl amine) depends on both the carbon number of pendant group and the DS of the hydrophobically modified poly(vinyl amine). At a comparable DS×n, the contact angle of PVAm-STO is larger than that of epoxy alkanes-PVAm coating film, and the difference between the contact angles of PVAm-STO and other hydrophobically modified poly(vinyl amine)s is as high as 50° to 60°.

The reaction process during the hydrophobic modification of poly(vinyl amine) with an appropriate epoxide is shown below:

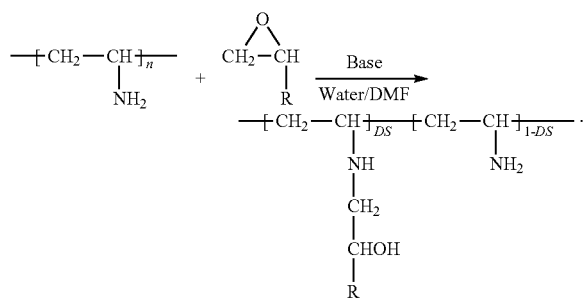

As discussed above, suitable R groups include —$C_2H_5$ for 1,2-epoxybutane (EPB); —$(CH_2)_3CH_3$ for 1,2-epoxyhexane (EPH); —$(CH_2)_5CH_3$ for 1,2-epoxyoctane (EPO); and —$C_6H_6$ for styrene oxide. As noted above, DS stands for degree of substitution.

In one example of the hydrophobic modification of poly(vinyl amine), the poly(vinyl amine) is dissolved in water to form a poly(vinyl amine) solution. After complete dissolution is obtained (e.g., as observed by the human eye), the pH value of the solution may be adjusted to about 9. A desirable amount of the epoxide may be added to an organic solvent (such as dimethyl formamide, DMF, which has the same mass as water) to form an epoxide solution. The poly(vinyl amine) solution and the epoxide solution may be mixed together to form a mixture. The mixture is allowed to react. In an example, the reaction mixture is maintained in a water bath of about 70° C. for about 48 hours, with continuous stirring at about 200 rpm to about 300 rpm. It is to be understood that no extra catalyst is included and no byproduct is generated in the reaction. The hydrophobically modified poly(vinyl amine) product may be collected after dialysis and freeze-drying.

The hydrophobically modified polymers have a hydrophilic backbone and hydrophobic pendant chains and are positively charged. These positively charged polymers 18 exhibit a combination of electrostatic interactions and hydrophobic interactions in an aqueous medium, and can be adsorbed by the negatively charged cellulose-based fibers 12. As such, the positively charged polymer 18 may be used to hydrophobically modify the naturally negatively charged cellulose-based fiber 12.

To form the hydrophobically modified cellulose-based fiber 16 (shown in FIG. 1B), an aqueous solution of the positively charged polymer 18 is formed. In an example, this aqueous solution includes 1.5 mg of the positively charged polymer 18 per ml of water. The cellulose-based fibers 12 may be added into the aqueous solution to form a suspension. The pH and/or background salt concentration of the suspension may be controlled while adsorption of the positively charged polymer 18 onto the negatively charged surface of the cellulose-based fiber 12 takes place. In an example, the pH value of the suspension may be controlled to 8.0 and the background salt concentration may be controlled using a KCl (potassium chloride) solution of 0.001 mol/L.

The reaction suspension is allowed to sit (with or without stirring) so that the adsorption of the polymer 18 on the surfaces of the fibers 12 takes place. The time of the adsorption may vary, and may depend upon the amount of fibers 12 and polymer 18 that are present in the suspension. In an example, the adsorption may take place for a time ranging from about 10 hours to about 15 hours. In another example, the adsorption time is about 12 hours.

After a suitable amount of time for adsorption, the hydrophobically modified cellulose-based fibers 16 are removed from the aqueous solution via filtration or another suitable technique. The fibers 16 may be air dried or exposed to heating.

The charge characteristic of the cellulose-based fibers may be detected before (fibers 12) and after (fibers 16) adsorption by tracing the electrophoretic mobility (EM) change.

The hydrophobically modified cellulose-based fibers 16 may be used in the method disclosed herein to form a composite 10. As mentioned above, FIGS. 1C through 1E schematically illustrate the steps involved in forming the composite 10.

Referring now to FIG. 1C, the method involves exposing the dried hydrophobically modified cellulose-based fibers 16 to the slow acting resin system 20. Prior to this exposure, the dried hydrophobically modified cellulose-based fibers 16 may be exposed to a degasing procedure to remove air from the inside of the fibers 16. In an example of the degasing procedure, the dried hydrophobically modified cellulose-based fibers 16 are placed in a sealed container and vacuumed for about 30 minutes. This procedure removes the air from inside the center 14 of the fibers 16 and also from the fiber surface. Air removal promotes the penetration of the liquid slow acting resin system 20 into the center 14 of the fiber 16, and the wetting of fiber 16 with the slow acting resin system 20.

The slow acting resin system 20 includes a polymer resin and a slow curing agent. Examples of the polymer resin include an unsaturated polyester resin, epoxy vinyl ester resins, polyurethane resins, epoxy resins, acrylic resins, etc. The unsaturated polyester resin may be a solution of polyester in a styrene (or other vinyl) monomer. In an example, the unsaturated polyester resin may be formed from the polycondensation of polyhydric alcohols and dibasic acids.

Examples of the polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, neopentyl glycol, hydrogenated bisphenol A, 1,4-butanediol, adducts of bisphenol A with propylene oxide or ethylene oxide, 1,2,3,4-tetrahydroxybutane, glycerin, trimethylolpropane, 1,3-propanediol, 1,2-cyclohexane glycol, 1,3-cyclohexane glycol, 1,4-cyclohexane glycol, 1,4-cyclohexanedimethanol, paraxylene glycol, bicyclohexyl-4,4'-diol, 2,6-decalin glycol, 2,7-decalin glycol, and combinations thereof.

Examples of α,β-unsaturated dibasic acids that may be used in the preparation of the unsaturated polyester resin include maleic acid, maleic anhydride, fumaric acid, itaconic acid, itaconic acid anhydride, and combinations thereof. Examples of saturated dibasic acid include phthalic acid, phthalic anhydride, halogenated phthalic anhydride, isophthalic acid, terephthalic acid, tetrahydrophthalic acid, tetrahydrophthalic anhydride, hexahydrophthalic acid, hexahydrophthalic anhydride, hexahydroterephthalic acid, hexahydroisophthalic acid, succinic acid, malonic acid, glutaric acid, adipic acid, sebacic acid, 1,12-dodecanedioic acid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, dialkyl esters thereof, and combinations thereof.

Examples of vinyl monomers include the previously mentioned styrene, as well as vinyl toluene, chlorostyrene, diallyl phthalate, triallyl cyanurate, methyl methacrylate, and combinations thereof.

The slow curing agent may be a slow curing initiator, a curing inhibitor, or combinations of the slow curing initiator and the curing inhibitor (a component that slows down the curing reaction). It is to be understood that the slow curing agent is selected so that it renders the slow acting resin system 20 with a curing time ranging from about 0.5 minutes (30 seconds) to about 5 minutes. In an example when the resin is an unsaturated polyester resin and the slow curing agent is the slow curing initiator alone, the slow curing initiator may be ter Butyl Per Benzoate (TBPB). In this example, the slow acting resin system 20 includes about 1.5 parts of the TBPB and about 100 parts of the unsaturated polyester resin. This example of the slow acting resin system 20 has a curing time of about 4.3 minutes when the curing temperature is about 150° C. In another example when the resin is an unsaturated polyester resin and the slow curing agent is the combination of the slow curing initiator and the curing inhibitor, the slow curing initiator may be TBPB and the curing inhibitor may be para benzoquinone (PBQ). In this example, the slow acting resin system 20 includes about 1.5 parts of the TBPB, about 0.1 parts of the PBQ, and about 100 parts of the unsaturated polyester resin. This example of the slow acting resin system 20 has a curing time of about 5 minutes when the curing temperature is about 150° C.

To expose the fibers 16 to the slow acting resin system 20, the slow acting resin system 20 may be introduced into the vacuum container used for degasing. The exposure (and thus penetration of the resin system 20 into the center 14) may take place for any desirable time. For example, the exposure time may range anywhere from about 1 minute to about 10 hours. In an example, the exposure takes place for about 6 hours. The fiber 16 and resin system 20 blend may be transferred to a suitable container and subjected to mechanical agitation (250 rpm) to achieve good penetration. During this step, the liquid slow acting resin system 20 penetrates into the center 14 of the fiber 16, and the surface of the fiber 16 is wetted with the slow acting resin system 20. This forms a pre-wetted hydrophobically modified cellulose-based fiber 17 (shown in FIG. 1C).

Any excess slow acting resin system 20 that is not penetrated into the center 14 or onto the surface of the hydrophobically modified cellulose-based fiber 16 may be removed. In an example, the removal of the excess slow acting resin system 20 is accomplished through a draining process.

It may be desirable to determine how much of the slow acting resin system 20 is present in the pre-wetted hydrophobically modified cellulose-based fiber 17. To make this determination, the dried hydrophobically modified cellulose-based fiber 16 may be weighed prior to exposure to the slow acting resin system 20, and the pre-wetted hydrophobically modified cellulose-based fiber 17 may be weighed subsequent to the exposure to the slow acting resin system 20 and the removal of the excess slow acting resin system 20. The weight of fiber 16 may be subtracted from the weight of fiber 17 to determine the amount (weight in this example) of the slow acting resin system 20 in the pre-wetted hydrophobically modified cellulose-based fiber 17.

The pre-wetted hydrophobically modified cellulose-based fiber 17 is then mixed with the fast acting resin system 22, as shown in FIG. 1D. The pre-wetted hydrophobically modified cellulose-based fiber 17 and resin system 22 blend may be subjected to mechanical agitation (250 rpm) to achieve good dispersion.

The fast acting resin system 22 includes a polymer resin and a fast curing agent. This polymer resin may also be an unsaturated polyester resin. The unsaturated polyester resin in the resin system 22 may be any unsaturated polyester resin previously described for the resin system 20. In some examples, the unsaturated polyester resins in the fast acting resin system 22 and the slow acting resin system 20 may be the same. In these instances, the respective curing agent renders the system 22, 20 fast acting/curing and slow acting/curing. In other examples, the unsaturated polyester resins in the fast acting resin system 22 and the slow acting resin system 20 are different types of polyester resins.

The fast curing agent may be a fast curing initiator, a curing promoter, or combinations of the fast curing initiator and the curing promoter (a component that enhances the curing reaction). It is to be understood that the fast curing agent is selected so that it renders the fast acting resin system 22 with a curing time ranging from about 20% to about 80% of the curing time of the slow acting resin system 22. As an example, the curing time of the fast acting resin system 22 may range from about 0.1 minutes to about 4 minutes, and will depend upon the curing time of the slow acting resin system 20.

In an example when the resin is an unsaturated polyester resin and the fast curing agent is the fast curing initiator alone, the fast curing initiator may be ter Butyl Per Octoate (TBPO). In this example, the fast acting resin system 22 includes about 1.5 parts of the TBPO and about 100 parts of the unsaturated polyester resin. This example of the fast acting resin system 22 has a curing time of about 3.4 minutes when the curing temperature is about 150° C. In another example when the resin is an unsaturated polyester resin and the fast curing agent is the combination of the fast curing initiator and the curing promoter, the fast curing initiator may be TBPO and the curing promoter may be dimethyl aniline. In this example, the fast acting resin system 22 includes about 1.5 parts of the TBPO, about 0.2 parts of the dimethyl aniline, and about 100 parts of the unsaturated polyester resin. This example of the fast acting resin system 20 has a curing time of about 2.65 minutes when the curing temperature is about 150° C.

The mixture of the pre-wetted hydrophobically modified cellulose-based fiber 17 and the fast acting resin system 22 may have other fillers added thereto. In an example, glass fibers and/or carbon fibers are also added to the mixture.

The mixture of the pre-wetted hydrophobically modified cellulose-based fiber 17 and the fast acting resin system 22 (with or without other fillers) may then be molded. Any suitable mold (not shown) may be used. In an example, the mold is made of stainless steel. The mold used to shape the composite 10 may be pre-heated to a desirable curing temperature. When the mold is not pre-heated, the mold with the mixture therein is exposed to heat at the curing temperature. It is to be understood that the curing temperature selected is at least a temperature that will cure both resin systems 20 and 22. In an example, the curing temperature ranges from about 60° C. to about 180° C. In another example, the curing temperature is about 150° C.

When exposed to heat at the curing temperature, the fast acting resin system 22 will undergo a chemical reaction and begin curing immediately. In contrast, the slow acting resin system 20 will experience a delayed chemical reaction and will remain in the liquid or gel phase at the onset of the molding/heating process. As the fast acting resin system 22 cures, the polyester resin crosslinks and the molecules within the polyester resin move closer together. This creates free space within the curing fast acting resin system 22. The slow acting resin system 20, which is still in the liquid or gel state as the fast acting resin system 22 begins to cure, flows out of the center 14 or other areas of the fiber 17 into the free space(s) in the fast acting resin system 22. The movement of the slow acting resin system 20 is due in part to the hydrophobicity of the fiber 16, the liquid/gel state of the slow acting resin system 20, and the forces resulting from curing of the fast acting resin system 22 (which pull upon the slow acting resin system 20). The introduction of the slow acting resin system 20 into the free space in the fast acting resin system 22 counteracts shrinkage that occurs as a result of curing the fast acting resin system 22.

As molding and heating continue (and after the fast acting resin system 22 is at least partially cured), the slow acting resin system 20 also begins to cure. Molding and heating are continued until both of the resin systems 22 and 20 are fully cured. As described above, the cure time depends, at least in part on the time of the slow acting resin system 20 to reach peak exotherm at the selected curing temperature. While some examples of the cure time have been given at the curing temperature of 150° C., it is to be understood that the curing time and temperature may be varied.

After the bimodal chemical reaction curing process is complete, both resin systems 20, 22 are cured and the composite 10 is formed. The composite 10 may be removed from the mold and allowed to cool.

The cure shrinkage of the composite 10 may be determined using the density of the uncured mixture (e.g., the wetted fiber 17 including the slow acting resin system 20 mixed with the fast acting resins system 22) and the density of the cured composite 10. The densities of the uncured mixture and the composite 10 may be individually determined using a pycnometer. The density of the composite 10 may be subtracted from the density of the uncured mixture to determine the amount of cure shrinkage.

It is believed that the bimodal curing method disclosed herein significantly reduces the shrinkage that is exhibited by the composite 10.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 60° C. to about 180° C. should be interpreted to include not only the explicitly recited limits of from about 60° C. to about 180° C., but also to include individual values, such as 85° C., 100° C., 150° C., etc., and sub-ranges, such as from about 75° C. to about 170° C.; from about 90° C. to about 140° C., etc. Furthermore, when "about" is utilized to describe a value, this is meant to encompass minor variations from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for controlling shrinkage of a composite, the method comprising:
    exposing a dried hydrophobically modified cellulose-based fiber to a slow acting resin system having a first curing time;
    removing an excess amount of the slow acting resin system to separate out a pre-wetted hydrophobically modified cellulose-based fiber;
    mixing the pre-wetted hydrophobically modified cellulose-based fiber with a fast acting resin system to form a mixture, the fast acting resin system having a second curing time that is less than the first curing time; and
    molding the mixture at a predetermined temperature, thereby curing the fast acting resin system prior to curing the slow acting resin system, and causing the slow acting resin system to flow into free space within the curing fast acting resin system prior to curing the slow acting resin system.

2. The method as defined in claim 1 wherein:
    prior to the mixing, the method further comprises:
        weighing the pre-wetted hydrophobically modified cellulose-based fiber; and
        determining an amount of the slow acting resin system in the pre-wetted hydrophobically modified cellulose-based fiber using a weight of the pre-wetted hydrophobically modified cellulose-based fiber and a weight of the dried hydrophobically modified cellulose-based fiber; and
    subsequent to the molding, the method further comprises:
        measuring cure shrinkage of the composite.

3. The method as defined in claim 1, further comprising making the dried hydrophobically modified cellulose-based fiber by:
    adding a cellulose-based fiber into an aqueous solution including a positively charged polymer to a form a suspension;
    allowing the positively charged polymer to absorb on a surface of the cellulose-based fiber for a predetermined time to form a hydrophobically modified cellulose-based fiber in the aqueous solution; and
    removing the aqueous solution, thereby forming the dried hydrophobically modified cellulose-based fiber.

4. The method as defined in claim 3, further comprising:
    maintaining a pH value of the suspension at about 8; and
    controlling a background salt concentration of the suspension using a potassium chloride (KCl) solution of 0.001 mol/L.

5. The method as defined in claim 3, further comprising forming the aqueous solution including the positively charged polymer by dissolving a hydrophobically modified poly(vinyl amine) in water.

6. The method as defined in claim 5, further comprising forming the hydrophobically modified poly(vinyl amine) by:
   dissolving poly(vinyl amine) in water to form a poly(vinyl amine) solution;
   adjusting a pH of the poly(vinyl amine) solution to about 9;
   adding an epoxide to an organic solvent to form an epoxide solution;
   mixing the poly(vinyl amine) solution with the epoxide solution to form a mixture; and
   allowing a reaction to take place within the mixture, thereby forming the hydrophobically modified poly (vinyl amine).

7. The method as defined in claim 6 wherein the epoxide is selected from the group consisting 1,2-Epoxybutane (EPB), 1,2-Epoxyhexane (EPH), 1,2-Epoxyoctane (EPO), and styrene oxide.

8. The method as defined in claim 1 wherein the exposing of the dried hydrophobically modified cellulose-based fiber to the slow acting resin system includes:
   degassing the dried hydrophobically modified cellulose-based fiber to remove air from a core of the dried hydrophobically modified cellulose-based fiber and from a surface of the dried hydrophobically modified cellulose-based fiber; and
   introducing a liquid form of the slow acting resin system to the degassed and dried hydrophobically modified cellulose-based fiber, whereby the liquid form of the slow acting resin system penetrates into the core of the dried hydrophobically modified cellulose-based fiber.

9. The method as defined in claim 1, further comprising forming the slow acting resin system by adding a slow curing agent to an unsaturated polyester resin, the slow curing agent rendering the slow acting resin system with the first curing time, wherein the first curing time ranges from about 0.5 minutes to about 5 minutes.

10. The method as defined in claim 9 wherein the slow curing agent is selected from a slow curing initiator or a combination of the slow curing initiator and a curing inhibitor.

11. The method as defined in claim 10 wherein the slow curing agent is the slow curing initiator, wherein the slow curing initiator is ter Butyl Per Benzoate (TBPB), and wherein about 1.5 parts of the TBPB are added to about 100 parts of the unsaturated polyester resin.

12. The method as defined in claim 10 wherein the slow curing agent is the combination of the slow curing initiator and the curing inhibitor, wherein the slow curing initiator is ter Butyl Per Benzoate (TBPB) and the curing inhibitor is para benzoquinone (PBQ), and wherein about 1.5 parts of the TBPB and about 0.1 parts of the PBQ are added to about 100 parts of the unsaturated polyester resin.

13. The method as defined in claim 1 wherein the first curing time ranges from about 0.5 minutes to about 5 minutes, and wherein the method further comprises forming the fast acting resin system by adding a fast curing agent to an unsaturated polyester resin, the fast curing agent rendering the fast acting resin system with the second curing time, wherein the second curing time ranges from 20% to about 80% of the first curing time.

14. The method as defined in claim 13, wherein the fast curing agent is selected from a fast curing initiator or a combination of the fast curing initiator and a curing promoter.

15. The method as defined in claim 14 wherein the fast curing agent is the fast curing initiator, wherein the fast curing initiator is ter Butyl Per Octoate (TBPO), and wherein about 1.5 parts of the TBPO are added to about 100 parts of the unsaturated polyester resin.

16. The method as defined in claim 14 wherein the fast curing agent is the combination of the fast curing initiator and the curing promoter, wherein the fast curing initiator is ter Butyl Per Octoate (TBPO) and the curing promoter is dimethyl aniline, and wherein about 1.5 parts of the TBPO and about 0.2 parts of the dimethyl aniline are added to about 100 parts of the unsaturated polyester resin.

17. The method as defined in claim 1 wherein the slow acting resin system and the fast acting resin system include a same type of unsaturated polyester resin and a different type of curing agent.

18. The method as defined in claim 1 wherein prior to the molding, the method further comprises pre-heating a mold in which the molding is to occur to the predetermined temperature ranging from about 60° C. to about 180° C.

19. The method as defined in claim 1 wherein the slow acting resin system flowing into the free space within the curing fast acting resin system counteracts shrinkage of the curing fast acting resin system.

20. The method as defined in claim 1 wherein the first curing time ranges from about 0.5 minutes to about 5 minutes, and wherein the second curing time ranges from 20% to about 80% of the first curing time.

21. The method as defined in claim 1, further comprising adding any of carbon fibers or glass fibers to the mixture prior to the molding.

22. The method as defined in claim 1 wherein the slow acting resin system includes an unsaturated polyester, the fast acting resin system includes an unsaturated polyester, or both the slow and fast acting resin system include an unsaturated polyester.

* * * * *